Feb. 3, 1959 — G. R. KERN — 2,871,562
ROTARY DENTAL TOOL
Filed Jan. 9, 1957
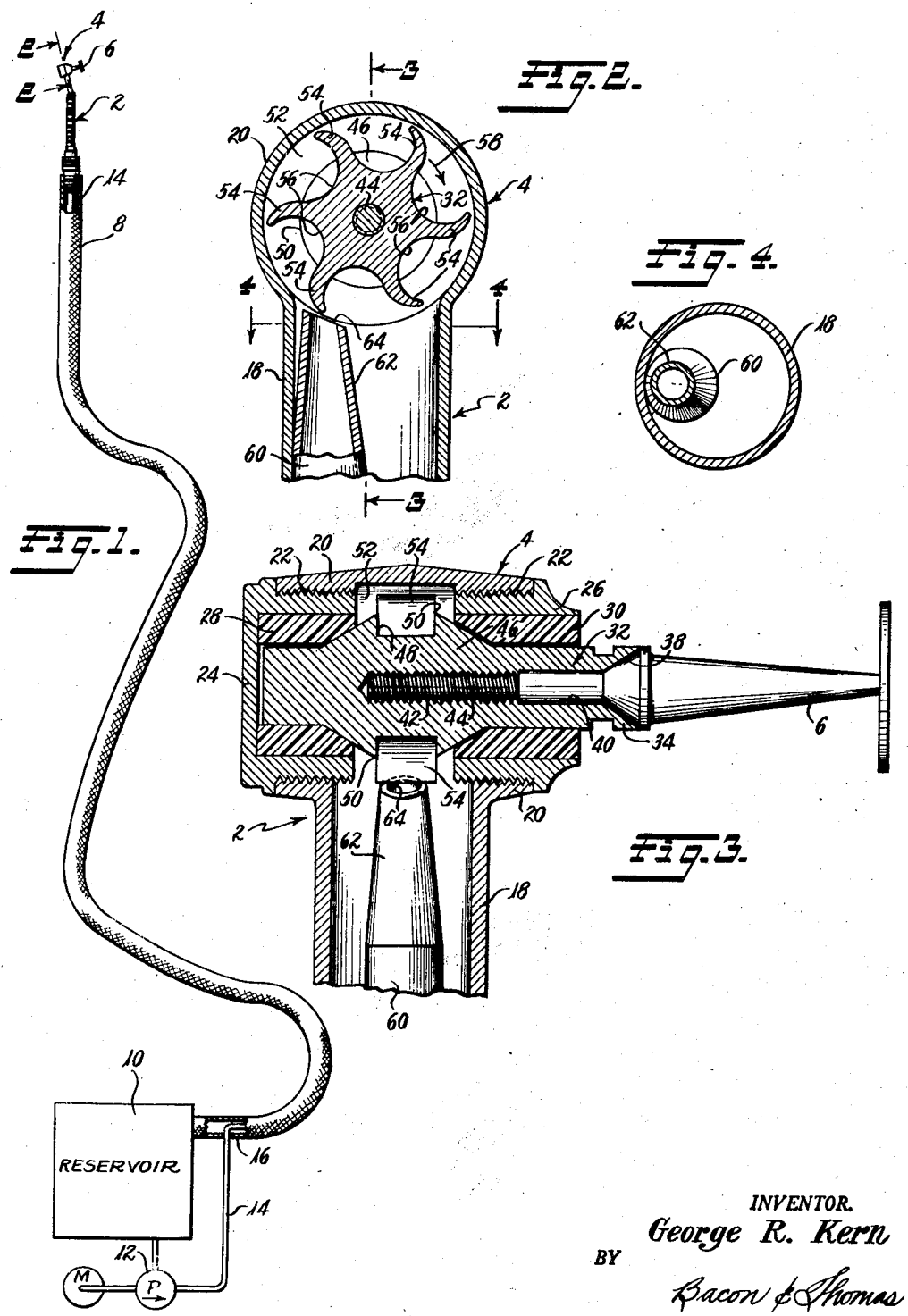
INVENTOR.
George R. Kern
BY
Bacon & Thomas
ATTORNEYS

_2,871,562_

ROTARY DENTAL TOOL

George R. Kern, Arlington, Va., assignor to Bowen & Company, Inc., Rockville, Md., a corporation of Delaware Application January 9, 1957, Serial No. 633,311

6 Claims. (Cl. 32—27)

This invention relates to power-driven rotary dental tools, and particularly to a relatively high speed tool driven by a fluid-actuated turbine.

It is contemplated that the turbine of the present invention be driven by water under pressure but the invention is adaptable to tools driven by air pressure. It has been heretofore proposed to drive rotary dental tools by fluid-actuated turbines, but difficulties arose due to the fact that the turbine must necessarily be of such small dimensions that extremely high speeds were necessary for satisfactory operation. Such extremely high speed tools depended principally upon the inertia of the rotating parts to provide the necessary torque for performing work on the patient's tooth and upon the swirling action of the fluid in the turbine chamber to rotate the turbine rotor. Such devices were generally unsatisfactory where prolonged loads were placed on the turbine. Any load on turbines of this type necessarily results in a substantial slowing down of the rotary elements and in slowing down, the turbines of the prior art effected disturbance of the rotary flow or swirling of the driving fluid in such a manner that high turbulence was created in the turbine chamber, resulting in a substantial back pressure and an appreciable loss of available power.

The turbine of the present invention includes features whereby the energy available in the pressure fluid is utilized most efficiently to supply torque to the tool and is so designed that the application of a load to the tool, which results in some slowing down thereof, does not diminish the torque applied to the turbine by the pressure fluid. This is accomplished by designing the turbine rotor and the chamber in which it operates so that, under load, high reaction forces are developed to drive the turbine and exhaust of spent fluid is effected efficiently without appreciable turbulence in the turbine chamber whereby the jet stream directed onto the turbine blades is not dispersed by turbulence or eddy currents and may apply its full pressure to the turbine in a most efficient manner.

It is therefore an object of this invention to provide a relatively high speed fluid turbine for a dental tool capable of delivering relatively high torque even when under load.

It is another object of this invention to provide a fluid-actuated turbine for a rotary dental tool wherein all fluid not actually doing useful work is rendered substantially incapable of interfering with the operation of the device.

It is a still further object of this invention to provide a rotary dental tool accomplishing the objectives noted above, which tool is of extremely simple construction, economical to manufacture, and highly reliable in operation.

Further and additional objects and advantages will become apparent to those skilled in the art as the description proceeds with reference to the accompanying drawings, wherein:

Fig. 1 is a schematic illustration of a tool apparatus embodying the present invention;

Fig. 2 is a fragmentary sectional view, on a highly enlarged scale, through the turbine casing and handle of Fig. 1, taken substantially along the line 2—2 of Fig. 1;

Fig. 3 is a longitudinal sectional view taken substantially along the line 3—3 of Fig. 2; and Fig. 4 is a transverse sectional view taken substantially along the line 4—4 of Fig. 2.

The apparatus shown in Fig. 1 comprises a handpiece 2 having thereon a fluid-actuated turbine 4 arranged to drive a rotary tool 6. The handpiece 2 includes a hollow tubular handle connected to a flexible tubing 8 which, in turn, communicates with a supply reservoir 10 for operating fluid. In the embodiment illustrated and described herein the operating fluid contemplated is water or other liquid, although it is to be understood that pressurized air may be employed. In the latter case no reservoir is necessary as air may be drawn directly from the atmosphere and exhausted thereto without the necessity of employing a recirculating system.

A pump 12 is arranged to draw fluid from the reservoir 10 and pump the same at relatively high pressure through a small pressure tubing 14. The pressure tubing 14 enters the flexible tubing 8, as indicated at 16, and is preferably also flexible. The pressure tubing 14 extends along the interior of the flexible tube 8 to the handpiece 2 and is there connected to a nozzle tube to be described later. The pump 12 may be driven by a motor M or any other suitable power source.

Referring now to Figs. 2, 3 and 4, the handpiece 2 comprises a hollow tubular handle portion 18 terminating at its outer end in a hollow transverse cylindrical head 20 defining the outer casing portion of the turbine 4. The transverse cylindrical head 20 is shown as being integral with the tubular handle 18 but it is to be understood that the parts may be fabricated separately and later joined in the relationship shown. The end portions of the cylindrical casing 20 are internally threaded as at 22 to receive a sealing end cap 24, at one end thereof, and an open fitting 26 at the other end. Each of the fittings 24 and 26 support bearings 28 and 30, respectively, rotatably supporting a rotor structure 32. The bearings 28 and 30 are preferably of a plastic material having a low coefficient of friction and being inert to water, oil and most liquids. A preferred material is available under the trade name of "Teflon." The use of such material for bearings is well known in the art.

The turbine rotor 32 is quite loosely journalled in the bearings 28 and 30 so that it may turn freely and is provided with a shank portion 34 extending outwardly of the casing 20 through the open fitting 26 and bearing 30. The extending portion 34 of the turbine rotor constitutes means to support the rotary tool 6. The portion 34 is provided with a conical socket 38 mating with a complementary portion of the tool 6. The conical socket 38 communicates with an axial bore 40 extending into the turbine rotor a substantial distance and threaded at 42 to receive the threaded shank 44 of tool 6. The conical socket 38 acts to accurately center the tool 6 on the turbine rotor.

The turbine rotor 32 includes a double tapered hub portion 46, the smaller portions of which extend into complementarily coned portions of the bearings 28 and 30. The outer periphery of the hub portion 46 may be described as being circumferentially grooved at 48, the edges of the groove being defined by relatively sharp peripheral edge portions 50. It is to be noted that the hollow interior of the turbine casing, defined by chamber 52, is of less axial extent than the internal diameter of the tubular handle 18. It is also to be noted (see particularly Fig. 2) that the internal diameter of the tubular handle 18 is nearly as great as the internal diameter of the chamber 52. It is also to be noted that the width of the groove 48 in the hub portion 46 of turbine rotor 32 is of a width substantially less than the axial length of the chamber 52.

The rotor 32 is provided with a plurality of turbine vanes 54 arcuately curved in a plane transverse to the axis of the rotor 32. The vanes 54 thus cooperate to define a plurality of circumferentially spaced and tangentially facing pockets 56. Each of the vanes 54 extends from the bottom of the groove 48 outwardly of the rotor hub a substantial distance but their outer ends are spaced from the inner periphery of the chamber 52 so that the rotor may rotate freely with large clearance between the ends of the vanes and the cylindrical side wall of the chamber 52. As clearly shown in Fig. 2, the curved vanes 54 define pockets facing rearwardly relative to the direction of rotation of the rotor 32, which is indicated by arrow 58.

By the construction thus far described, it is apparent that the rotor comprises circumferentially spaced tangentially directed pockets 56 having open axial ends outwardly of the edges 50 but being closed on all sides inwardly of the sharp edges 50, previously described. The vanes 54 may be formed integral with the hub portion 46 or may be separate elements permanently secured thereto, if desired. In like manner the rotor 32 may be formed of a plurality of separate parts rather than being a single piece, as shown.

The previously described pressure tubing 14, extending along the interior of flexible tube 8, is connected to an end of a rigid but small nozzle tube 60 extending along the interior of the tubular handle 18 and secured to one side thereof in any suitable manner, such as by soldering. The nozzle tube 60 terminates in a tapered nozzle portion 62 adjacent the turbine casing 20 and its free end is cut at an angle to define a small oblique orifice at 64 substantially tangent to the inner peripheral surface of the chamber 52 and closely adjacent the path of rotation of the ends of vanes 54. The tapered nozzle portion 62 is arranged to direct a high speed jet of pressure fluid toward but tangentially of the rotor 32 so that the jet enters the pockets defined by the vanes 54. The axis of the nozzle portion 62 is, therefore, directed tangentially of the rotor 32 and at an axial position substantially in the plane of the center of the groove 48 and vanes 54.

It is to be noted that the nozzle orifice, at 64, is very small in comparison to the diameter of the tubular handle 18 and that the space occupied by the nozzle tube 60 is likewise very small in comparison to the sectional area of the tubular handle 18. As is obvious, the interior of the tubular handle 18 communicates with the chamber 52.

When fluid under pressure is delivered through nozzle 62 it emerges through the orifice 64 in the form of a high speed jet and impinges on the vanes 54 of the turbine rotor. The vanes are so curved and configured that the inner surfaces of the pockets 56 act to deflect the jet of fluid inwardly and rearwardly and the resultant reaction forces developed by such deflection are applied in a generally tangential direction to the rotor 32 to impose driving torque thereon. It is to be further noted that the circumferential extent of each of the pockets 56 is quite substantial. When the jet of fluid issuing from the orifice at 64 first enters a pocket 56, it is deflected thereby in a direction rearwardly of the direction of rotation of the rotor 32 and applies a high rotational torque to the rotor. The fluid thus deflected is directed rearwardly and outwardly of the rotor into the end of the tubular handle 18 to exhaust. After such deflection, the fluid of the jet has lost a great deal of its velocity and, therefore, requires a much larger passage area to insure that no back pressure be exerted on the approaching vane 54. The relative sectional areas of the tubular handle 18 and the nozzle 62 are such that the fluid thus deflected exhausts directly into the handle 18 and thence into flexible tube 8 back to the reservoir 10. High torque is developed, as described, even though the turbine may be under fairly heavy load and rotates at a comparatively low rate of speed. The deflection of the jet by the pockets 56 continues until the pocket has moved to such position that the next following vane 54 crosses the orifice 64 and during that entire interval of time the described reaction forces are developed. As each pocket 56 moves across the orifice 64, the fluid from the jet enters that pocket.

As is obvious, the entire chamber 52 is filled with operating fluid but the communication between the chamber 52 and tubular handle 18 is so large that the fluid in the chamber may spin with the turbine and exhaust into the handle 18 without imposing substantial retarding forces on the rotor itself.

Previous mention was made of the fact that the vanes 54 are of less axial extent than the chamber 52. Thus, as fluid issuing from the nozzle 62 loses velocity in the chamber 52, it may exhaust from the pockets 56 in an axial direction and enter the annular space between the axial ends of the vanes and the end walls of chamber 52 with substantially no turbulence and may proceed in a circumferential direction therein to exhaust in the handle 18 without retarding the rotor by virtue of turbulence which would be present if the clearances between the vanes 54 and the boundary surfaces of the chamber 52 were small.

Because of the fact that the chamber 52 is filled with fluid during operation of the tool, the jet issuing from orifice 64 will be dispersed to a small degree and tend to diverge slightly. Those portions of the jet diverging sufficiently to miss the vanes 54 are split from the jet by the sharp edges 50 and deflected in an axial direction, while moving circumferentially, by the conical portions of the hub 46 and to the axial ends of the chamber 52 where they may proceed to exhaust without offering any resistance to rotation of the rotor 32.

Since the interior of the tubular handle 18 is of the large dimensions described, the diameter thereof is substantially greater than the axial length of the chamber 52 to thus insure that no substantial resistance to flow outwardly in handle 18 is imposed on the exhausted and spent fluid.

By the structure thus described applicant has accomplished the objectives set forth heretofore.

While a single specific embodiment of the invention is shown and described herein, it is to be understood that the same is merely illustrative. The invention defined by the appended claims may include other structural embodiments.

I claim:

1. In a rotary dental tool, a handpiece comprising; a generally cylindrical hollow casing having a rotor journalled therein for rotation about the axis of said casing, an end of said rotor extending outwardly of an end of said casing and having means for mounting a tool thereon, a tubular handle extending transversely of the axis of said casing, the interior of said tubular handle communicating with the interior of said casing and being of a diameter, at the point of communication with the interior of said casing, nearly as great as the interior diameter of said casing, said rotor being provided with spaced tangentially extending vanes defining between them tangentially directed open pockets, a small tube occupying only a minor portion of the transverse area of said handle extending along one side of the interior of said tubular handle and terminating in a nozzle portion directed generally tangentially of said rotor and into the said open pockets thereof.

2. A rotary dental tool as defined in claim 1, wherein the axial length of the hollow interior of said casing is no greater than the interior diameter of said tubular handle.

3. A rotary dental tool as defined in claim 1, wherein the axial length of said vanes is substantially less than the axial length of the hollow interior of said casing.

4. A rotary dental tool as defined in claim 1, wherein said rotor comprises a hub portion having a circumferential groove, said vanes being arcuate in a plane transverse to the axis of said rotor and extending from the bottom of said groove a substantial distance outwardly of the periphery of said hub portion.

5. A rotary tool as defined in claim 4, wherein said hub portion tapers axially away from opposite sides of said groove whereby the edges of said groove are defined by sharp peripheral edges.

6. A rotary dental tool as defined in claim 1, wherein said pockets are each of such circumferential extent and configuration that fluid directed into the leading edge thereof, by said nozzle, is deflected rearwardly and outwardly of said rotor into said tubular handle adjacent said nozzle.

References Cited in the file of this patent

UNITED STATES PATENTS 2,733,044     Danel _____ Jan. 31, 1956

FOREIGN PATENTS 163,217     Austria _____ Oct. 15, 1948

OTHER REFERENCES

Nelson et al. Article, Journal of the American Dental Assoc., vol. 47, pp. 324–329, September 1953.